United States Patent
Hu (10) Patent No.: US 11,778,079 B2
(45) Date of Patent: Oct. 3, 2023

(54) METHOD FOR CONTROLLING FOLDABLE TERMINAL AND FOLDABLE TERMINAL

(71) Applicant: VIVO MOBILE COMMUNICATION CO., LTD., Dongguan (CN)

(72) Inventor: Guoliang Hu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/381,152

(22) Filed: Jul. 20, 2021

(65) Prior Publication Data
US 2021/0352168 A1 Nov. 11, 2021

Related U.S. Application Data

(63) Continuation of application No. PCT/CN2020/071761, filed on Jan. 13, 2020.

(30) Foreign Application Priority Data

Jan. 22, 2019 (CN) .......................... 201910060216.X (51) Int. Cl.
*H04M 1/00* (2006.01)
*H04M 1/02* (2006.01)

(52) U.S. Cl.
CPC ....... *H04M 1/0268* (2013.01); *H04M 1/0214* (2013.01)

(58) Field of Classification Search
CPC ............. H04M 1/0214; H04M 1/0268; H04M 1/0245; H04M 1/0243
See application file for complete search history.

(56) References Cited

U.S. PATENT DOCUMENTS

| 9,684,342 B2 * | 6/2017 | Kim ................ G06F 3/04883 |
| 2002/0090970 A1 * | 7/2002 | Ko ..................... H04M 1/0216 |
| | | 455/575.3 |
| 2004/0212602 A1 * | 10/2004 | Nako ................. G06F 15/0283 |
| | | 345/173 |
| 2013/0205142 A1 * | 8/2013 | Jung ..................... G06F 1/1677 |
| | | 713/300 |

FOREIGN PATENT DOCUMENTS

| CN | 105653162 A | 6/2016 |
| CN | 107168629 A | 9/2017 |
| CN | 107656683 A | 2/2018 |
| CN | 107765952 A | 3/2018 |

(Continued)

OTHER PUBLICATIONS

International Search Report issued in corresponding International Application No. PCT/CN2020/071761, dated Apr. 1. 2020, 4 pages.

(Continued)

*Primary Examiner* — Nhan T Le
(74) *Attorney, Agent, or Firm* — IPX PLLC (57) ABSTRACT

The present disclosure discloses a method for controlling a foldable terminal and a foldable terminal. The method includes: receiving a first input for the foldable terminal; obtaining a folding angle of the foldable terminal; and controlling, in a case that the folding angle meets a target condition, the foldable terminal to power on or power off in response to the first input.

12 Claims, 3 Drawing Sheets

(56) References Cited

FOREIGN PATENT DOCUMENTS

| | | |
|---|---|---|
| CN | 108089907 A | 5/2018 |
| CN | 108182033 A | 6/2018 |
| CN | 108509123 A | 9/2018 |
| CN | 109600468 A | 4/2019 |
| EP | 3285133 A1 | 2/2018 |

OTHER PUBLICATIONS

First Office Action issued in related Chinese Application No. 201910060216.X, dated Mar. 13, 2020, 7 pages.
Third Office Action issued in related Chinese Application No. 201910060216.X, dated Feb. 18, 2021, 5 pages.

* cited by examiner

METHOD FOR CONTROLLING FOLDABLE TERMINAL AND FOLDABLE TERMINAL

CROSS-REFERENCE TO RELATED APPLICATIONS

This application is a bypass continuation of PCT Application No. PCT/CN2020/071761 filed Jan. 13, 2020, which claims priority to Chinese Patent Application No. 201910060216.X, filed on Jan. 22, 2019 in China, both of which are incorporated herein by reference in their entireties.

TECHNICAL FIELD

The present disclosure relates to the technical field of foldable terminals, and in particular, to a method for controlling a foldable terminal and a foldable terminal.

BACKGROUND

With the development of science and technology, a flexible display device develops in the direction of large screen. Based on foldability of the flexible display, the flexible display device can be folded, that is, a foldable terminal. Therefore, foldability of the flexible display provides great convenience for the flexible display device with the large screen.

In a related technical solution, to control a foldable terminal to power off, a power key needs to be touched and held, and then a power-off key displayed on the flexible display device is tapped. To control a foldable terminal to power on, the power key also needs to be touched and held. In the related art, operations in a power-on/power-off solution are cumbersome, and user experience is poor.

In conclusion, there is no technical solution for rapid switching between a power-on state and a power-off state of the foldable terminal in the related technical filed.

SUMMARY

Embodiments of the present disclosure provide a method for controlling a foldable terminal and a foldable terminal.

According to a first aspect, an embodiment of the present disclosure provides a method for controlling a foldable terminal, and the method includes:
receiving a first input for a foldable terminal;
obtaining a folding angle of the foldable terminal; and
controlling, in a case that the folding angle meets a target condition, the foldable terminal to power on or power off in response to the first input.

Optionally, the receiving a first input for a foldable terminal includes:
receiving a deformation operation for the foldable terminal; and
the controlling, in a case that the folding angle meets a target condition, the foldable terminal to power on or power off in response to the first input includes:
controlling, in a case that the folding angle is greater than or equal to a first preset value, the foldable terminal to power on in response to the first input; and
controlling, in a case that the folding angle is less than or equal to the first preset value, the foldable terminal to power off in response to the first input.

Optionally, the receiving a first input for a foldable terminal includes:
receiving an input for a first key of the foldable terminal.

Optionally, the receiving an input for a first key of the foldable terminal includes:
receiving a tap input for a power key of the foldable terminal; and
the controlling, in a case that the folding angle meets a target condition, the foldable terminal to power on or power off in response to the first input includes:
controlling, in a case that the folding angle is greater than or equal to a second preset value, the foldable terminal to power on in response to the first input; and
controlling, in a case that the folding angle is less than or equal to the second preset value, the foldable terminal to power off in response to the first input.

Optionally, the method further includes:
controlling, in a case that the folding angle does not meet the target condition, the foldable terminal to run a first application or stop running a second application in response to the first input.

According to a second aspect, an embodiment of the present disclosure provides a foldable terminal. The foldable terminal includes a foldable display screen, and the foldable terminal further includes:
a receiving module, configured to receive a first input for a foldable terminal;
an obtaining module, configured to obtain a folding angle of the foldable terminal; and
a control module, configured to control, in a case that the folding angle meets a target condition, the foldable terminal to power on or power off in response to the first input.

Optionally, the receiving module includes:
a first receiving unit, configured to receive a deformation operation for the foldable terminal; and
the control module is specifically configured to:
control, in a case that the folding angle is greater than or equal to a first preset value, the foldable terminal to power on in response to the first input; and
control, in a case that the folding angle is less than or equal to the first preset value, the foldable terminal to power off in response to the first input.

Optionally, the receiving module includes:
a second receiving unit, configured to receive an input for a first key of the foldable terminal.

Optionally, the receiving module includes:
a third receiving unit, configured to receive a tap input for a power key of the foldable terminal; and
the control module is specifically configured to:
control, in a case that the folding angle is greater than or equal to a second preset value, the foldable terminal to power on in response to the first input; and
control, in a case that the folding angle is less than or equal to the second preset value, the foldable terminal to power off in response to the first input.

Optionally, the control module is further configured to:
control, in a case that the folding angle does not meet the target condition, the foldable terminal to run a first application or stop running a second application in response to the first input.

According to a third aspect, an embodiment of the present disclosure provides a foldable terminal, including: a memory, a processor, and a computer program that is stored in the memory and that can be run by the processor, and when the computer program is executed by the processor, the steps of the foregoing method for controlling a foldable terminal are implemented.

According to a fourth aspect, an embodiment of the present disclosure provides a computer-readable storage medium. The computer-readable storage medium stores a computer program, and when the computer program is executed by a processor, the steps of the method for controlling a foldable terminal in the first aspect are implemented.

BRIEF DESCRIPTION OF DRAWINGS

The accompanying drawings described herein are intended to provide a further understanding of the present disclosure, and constitute a part of the present disclosure. The illustrative embodiments of the present disclosure and descriptions thereof are intended to describe the present disclosure, and do not constitute limitations on the present disclosure. In the accompanying drawings.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Embodiments of the present disclosure provide a method for controlling a foldable terminal and a foldable terminal. The method may be applied to a foldable terminal with a foldable flexible display. The foregoing foldable terminal may be a foldable terminal such as a mobile phone or a tablet computer.

Embodiment 1

Figure 1:
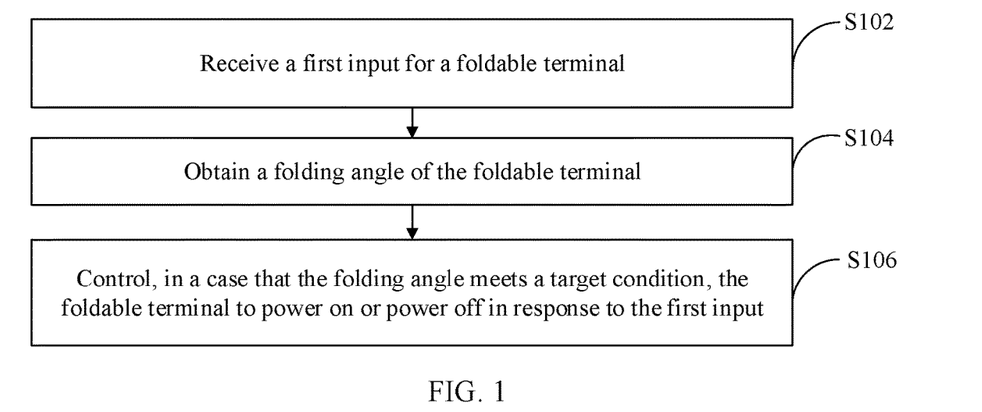
FIG. 1 is a flowchart of a method for controlling a foldable terminal according to an embodiment of the present disclosure.

FIG. 1 is a flowchart of a method for controlling a foldable terminal according to an embodiment of the present disclosure. The method shown in FIG. 1 includes at least the following steps.

Step 102: Receive a first input for a foldable terminal.

In this embodiment of the present disclosure, the first input for the foldable terminal may be a deformation input for the display screen of the foldable terminal, an input for a specific key of the foldable terminal, a press input for the display screen of the foldable terminal, a fingerprint input performed by a fingerprint recognition module of the foldable terminal, or the like.

Step 104: Obtain a folding angle of the foldable terminal.

In this embodiment of the present disclosure, the folding angle may be an included angle between adjacent display units when the display screen is deformed by a deformation operation on the foldable terminal, where a plurality of display units may be formed when the display screen is deformed due to the deformation operation on the foldable terminal, for example, two or three display units. In this embodiment of the present disclosure, two display units are formed.

Step 106: Control, in a case that the folding angle meets a target condition, the foldable terminal to power on or power off in response to the first input.

When an included angle between adjacent display units meets the target condition, the foldable terminal is controlled to power on or power off in response to the first input, and a target condition corresponding to the power-on operation is different from a target condition corresponding to the power-off operation.

In this embodiment of the present disclosure, after the first input for the foldable terminal is received, when the folding angle meets the target condition, the foldable terminal is controlled to power on or power off. For example, when the first input is a deformation operation for the foldable terminal, in a case that a folding angle formed by the deformation operation meets the target condition, the foldable terminal is directly controlled to power on or power off, thereby effectively improving efficiency of the power-on or power-off operation.

Figure 2:
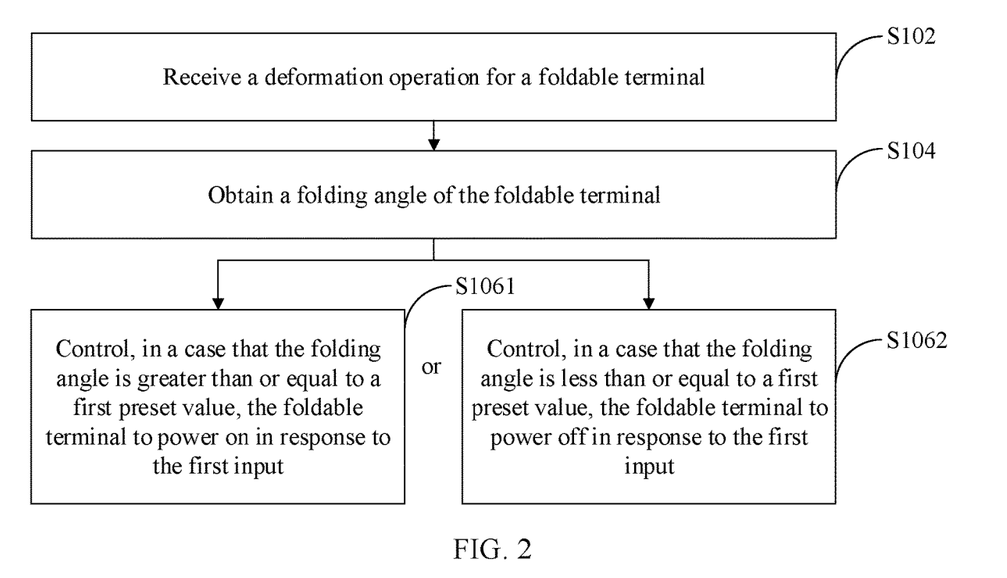
FIG. 2 is a flowchart of another method for controlling a foldable terminal according to an embodiment of the present disclosure.

In this embodiment of the present disclosure, referring to FIG. 2, step 102 specifically includes:

receiving a deformation operation for the foldable terminal; and step 106 specifically includes:

S1061. Control, in a case that the folding angle is greater than or equal to a first preset value, the foldable terminal to power on in response to the first input.

In this embodiment of the present disclosure, in the process of the folding angle of the foldable terminal gradually increasing, if the folding angle of the foldable terminal is greater than or equal to the first preset value, the foldable terminal may power on in response to the first input.

Further, the first input may be a deformation operation for the foldable terminal. In this case, in a process of performing the deformation operation on the foldable terminal and in which the folding angle gradually increases, when the folding angle meets the target condition, for example, when the folding angle is greater than or equal to a first preset angle, the foldable terminal is controlled to power on. It should be noted herein that the first preset angle may be set based on an actual requirement. For example, when a user wishes that the foldable terminal powers on at a smaller expanding angle, a smaller value of the first preset angle may be set, for example, 5 degrees, 10 degrees, or 15 degrees. When the user wishes that the foldable terminal powers on at a larger expanding angle, a larger value of the first preset angle may be set, for example, 30 degrees, 40 degrees, or 50 degrees. This embodiment of the present disclosure sets no specific limitation on the value of the first preset angle.

S1062. Control, in a case that the folding angle is less than or equal to the first preset value, the foldable terminal to power off in response to the first input.

In this embodiment of the present disclosure, for a case that the folding angle of the foldable terminal decreases, when the folding angle decreases to the first preset value or less than the preset value, the foldable terminal is controlled to power off in response to the deformation operation performed on the foldable terminal.

In a specific embodiment, when the first operation for the foldable terminal is a deformation operation in which the folding angle gradually decreases, when the folding angle decreases to the first preset value, the power-off operation may be directly performed on the foldable terminal. In this way, power-off efficiency of the foldable terminal can be effectively improved.

In this embodiment of the present disclosure, the first preset value is used as a threshold of the folding angle of the foldable terminal in the power-on or the power-off operation. For example, when the foldable terminal is in a power-on state and the folding angle gradually decreases, and it is detected that the folding angle decreases to the first preset value, the foldable terminal powers off. When the foldable terminal is in a power-off state and the folding angle gradually increases, and it is detected that the folding angle increases to the first preset value, the foldable terminal powers on.

According to the method for controlling a foldable terminal in this embodiment of the present disclosure, a specific input type of the first input may be set in advance. After the first input is set, the folding angle of the foldable terminal is obtained after the first input for the foldable terminal is received, and when the folding angle meets the target condition, the foldable terminal is controlled to power on or power off In this technical solution, for the foldable device, power-off or power-on may be performed quickly, thereby effectively overcoming a technical defect in a related technical solution that the foldable terminal may power on only after a power key is pressed for a long time and then a subsequent step.

Figure 3:
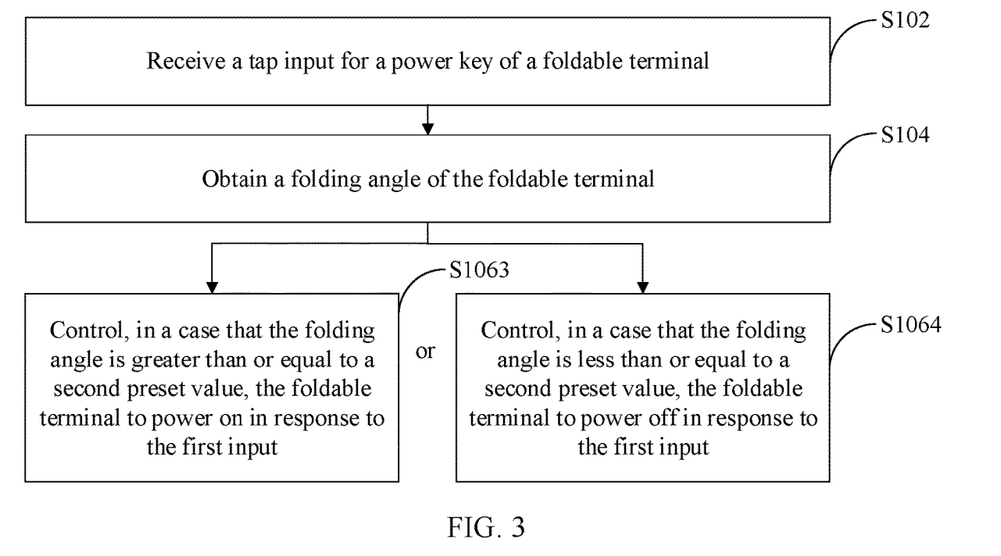
FIG. 3 is a flowchart of still another method for controlling a foldable terminal according to an embodiment of the present disclosure.

Further, in an embodiment of the present disclosure, referring to FIG. 3, the receiving an input for a first key of the foldable terminal includes:

receiving a tap input for a power key of the foldable terminal; and the controlling, in a case that the folding angle meets a target condition, the foldable terminal to power on or power off in response to the first input includes:

S1063. Control, in a case that the folding angle is greater than or equal to a second preset value, the foldable terminal to power on in response to the first input.

In this embodiment of the present disclosure, when the folding angle of the foldable terminal gradually increases to the second preset value or is greater than the second preset value, and the tap input for the power key is received, the foldable terminal may be controlled to power on, thereby overcoming a technical defect in a related technical solution that the foldable terminal may power on only when the power key is pressed for a long time (generally greater than or equal to 3 s).

S1064. Control, in a case that the folding angle is less than or equal to the second preset value, the foldable terminal to power off in response to the first input.

In this embodiment of the present disclosure, when the folding angle of the foldable terminal gradually decreases to the second preset value or is less than the second preset value, and the tap input for the power key is received, the foldable terminal may be controlled to power off, thereby overcoming a technical defect in a related technical solution that the foldable terminal may power off only when the foldable terminal receives tapping on a specified area (in the related technical solution, an area that a "YES" key is in) of the display screen after the power key is pressed for a long time (generally greater than or equal to 3 s).

It should be noted herein that there is no specified size relationship between the first preset angle and the second preset value. The user may set the first preset angle and the second preset angle as required. The first preset value and the second preset value may be the same or different. In addition, the first preset value may be greater than the second preset value, or the first preset value may be less than the second preset value.

In another specific embodiment of this embodiment of the present disclosure, the first key may be a volume key, and the method further includes:

(1) When the folding angle trends to decrease, in a case that the folding angle is greater than or equal to a third preset value, the foldable terminal is control to perform an operation of switching to a silent mode or a vibration mode in response to the first input.

In this way, a technical defect that the foldable terminal gradually switch to the silent mode or the vibration mode only during a continuous press for a "volume +" key is effectively overcome.

(2) When the folding angle trends to increase, in a case that the folding angle is less than or equal to a third preset value, the foldable terminal is control to perform an operation of switching to a maximum volume mode in response to the first input.

In this way, a technical defect that the foldable terminal may gradually switch to the maximum volume mode only during a continuous press for a "volume −" key is effectively overcome.

Figure 4:
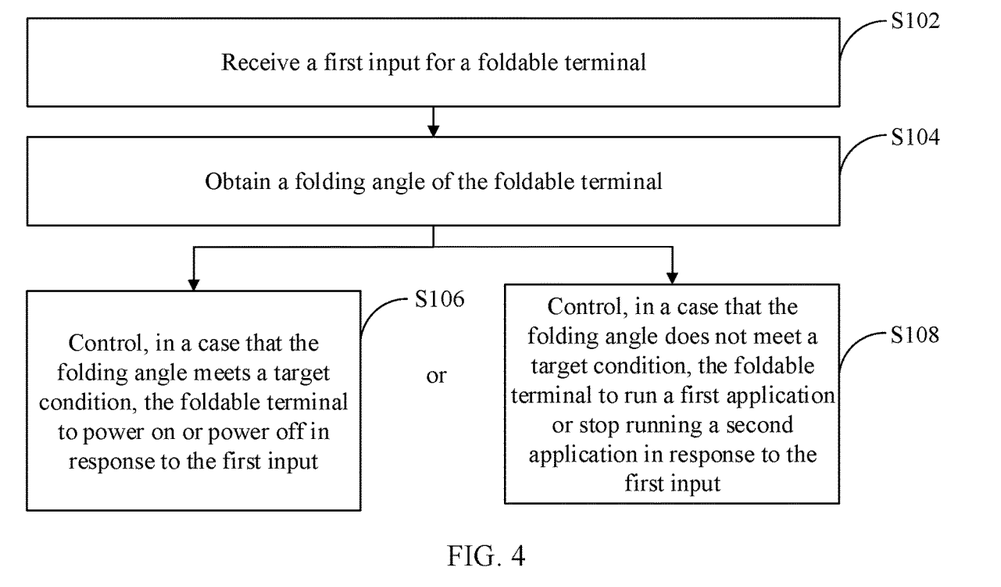
FIG. 4 is a flowchart of still another method for controlling a foldable terminal according to an embodiment of the present disclosure.

In this embodiment of the present disclosure, referring to FIG. 4, the method further includes:

S108. Control, in a case that the folding angle does not meet the target condition, the foldable terminal to run a first application or stop running a second application in response to the first input.

In this embodiment of the present disclosure, when the folding angle does not meet the target condition, the foldable terminal is controlled to run the first application or stop running the second application in response to the first input. In this way, a specified application can be quickly run or stopped.

In an embodiment of the present disclosure, when the folding angle meets a first target condition, the foldable terminal may be controlled to power off, and when the folding angle does not meet the first target condition, the foldable terminal may be controlled to stop running the first application. When the folding angle meets a second target condition, the foldable terminal may be controlled to power on, and when the folding angle does not meet the second target condition, the foldable terminal may be controlled to run the second application. The following describes a specific embodiment.

When the folding angle tends to decrease, and the folding angle decreases to an angle a, the first application is stopped, and when the folding angle decreases to an angle b, the foldable terminal is controlled to power off, where the angle b is greater than or equal to the angle a. When the folding angle tends to increase, and the folding angle increases to an angle c, the foldable terminal is controlled to power on, and when the folding angle increases to an angle d, the second application is run, where the angle d is greater than or equal to the angle c.

According to the method for controlling a foldable terminal provided in this embodiment of the present disclosure, a specified application can be quickly run or stopped, thereby avoiding complex steps that the foldable terminal needs to switch to an interface of a specified application and then performs a complex stop operation on a corresponding operation interface to stop running the specified application, and finds an icon of a corresponding application and then receives a tap operation for the corresponding icon to run the specified application.

Figure 5:
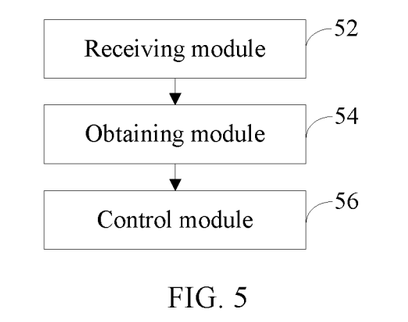
FIG. 5 is a module diagram of a foldable terminal according to an embodiment of the present disclosure.

Corresponding to the method for controlling a foldable terminal provided in Embodiment 1, an embodiment of the present disclosure provides a foldable terminal. Referring to FIG. 5, the foldable terminal shown includes:

a receiving module 52, configured to receive a first input for a foldable terminal;

an obtaining module 54, configured to obtain a folding angle of the foldable terminal; and a control module 56, configured to control, in a case that the folding angle meets a target condition, the foldable terminal to power on or power off in response to the first input.

In an embodiment, the receiving module 52 includes:

a first receiving unit, configured to receive a deformation operation for the foldable terminal; and the control module 56 is specifically configured to:

control, in a case that the folding angle is greater than or equal to a first preset value, the foldable terminal to power on in response to the first input; and control, in a case that the folding angle is less than or equal to the first preset value, the foldable terminal to power off in response to the first input.

In an embodiment, the receiving module 52 includes:

a second receiving unit, configured to receive an input for a first key of the foldable terminal.

In an embodiment, the receiving module 52 includes:

a third receiving unit, configured to receive a tap input for a power key of the foldable terminal; and the control module is specifically configured to:

control, in a case that the folding angle is greater than or equal to a second preset value, the foldable terminal to power on in response to the first input; and control, in a case that the folding angle is less than or equal to the second preset value, the foldable terminal to power off in response to the first input.

In an embodiment, the control module 56 is further configured to:

control, in a case that the folding angle does not meet the target condition, the foldable terminal to run a first application or stop running a second application in response to the first input.

According to the foldable terminal provided in this embodiment of the present disclosure, after the first input for the foldable terminal is received, when the folding angle meets the target condition, the foldable terminal is controlled to power on or power off. For example, when the first input is a deformation operation for the foldable terminal, in a case that a folding angle formed by the deformation operation meets the target condition, the foldable terminal is directly controlled to power on or power off, thereby effectively improving efficiency of the power-on or power-off operation. Alternatively, when the first input is a pressing operation for a specified key, in a case that the folding angle meets the target condition, the foldable terminal is controlled to power on or power off in response to the first input, thereby effectively improving efficiency of the power-on or power-off operation of the foldable terminal.

In addition, according to the foldable terminal provided in this embodiment of the present disclosure, a specified application can be quickly run or stopped, thereby avoiding complex steps that the foldable terminal needs to switch to an interface of a specified application and then performs a complex stop operation on a corresponding operation interface to stop running the specified application, and finds an icon of a corresponding application and then receives a tap operation for the corresponding icon to run the specified application.

Figure 6:
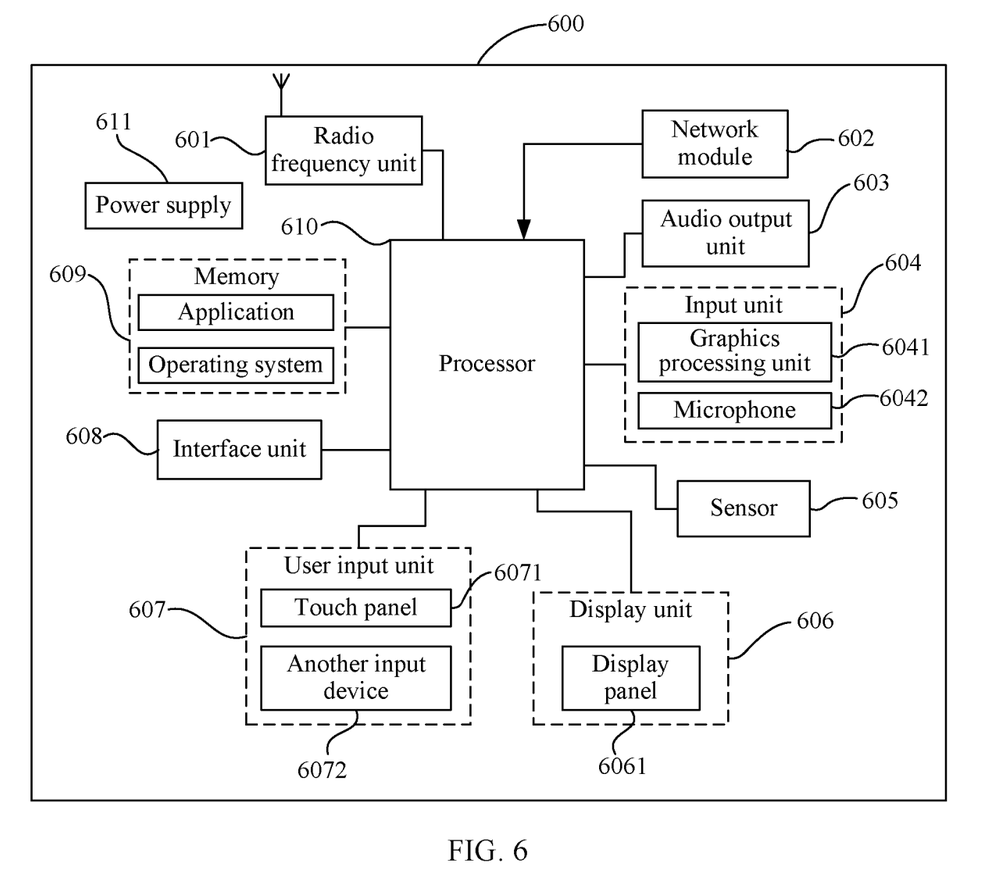
FIG. 6 is a schematic diagram of a hardware structure of a foldable terminal according to an embodiment of the present disclosure.

FIG. 6 is a schematic diagram of a hardware structure of a foldable terminal according to embodiments of the present disclosure. A foldable terminal 600 shown in FIG. 6 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the structure of the foldable terminal shown in FIG. 6 constitutes no limitation on the foldable terminal, and the foldable terminal may include more or fewer parts than those shown in the figure, or combine some parts, or have a different part arrangement. In this embodiment of the present disclosure, the foldable terminal includes but is not limited to a mobile phone, a tablet computer, a laptop computer, a palmtop computer, and the like.

In this embodiment of the present disclosure, the memory 609 stores a computer program. When the computer program is executed by the processor 610, the following steps can be implemented:

receiving a first input for a foldable terminal;

obtaining a folding angle of the foldable terminal; and controlling, in a case that the folding angle meets a target condition, the foldable terminal to power on or power off in response to the first input.

Optionally, when the computer program is executed by the processor 610, the receiving a first input for a foldable terminal includes:

receiving a deformation operation for the foldable terminal; and the controlling, in a case that the folding angle meets a target condition, the foldable terminal to power on or power off in response to the first input includes:

controlling, in a case that the folding angle is greater than or equal to a first preset value, the foldable terminal to power on in response to the first input; and controlling, in a case that the folding angle is less than or equal to the first preset value, the foldable terminal to power off in response to the first input.

Optionally, when the computer program is executed by the processor 610, the receiving a first input for a foldable terminal includes:

receiving an input for a first key of the foldable terminal.

Optionally, when the computer program is executed by the processor 610, the receiving an input for a first key of the foldable terminal includes:

receiving a tap input for a power key of the foldable terminal; and the controlling, in a case that the folding angle meets a target condition, the foldable terminal to power on or power off in response to the first input includes:

controlling, in a case that the folding angle is greater than or equal to a second preset value, the foldable terminal to power on in response to the first input; and controlling, in a case that the folding angle is less than or equal to the second preset value, the foldable terminal to power off in response to the first input.

Optionally, when the computer program is executed by the processor 610, the method further includes:

controlling, in a case that the folding angle does not meet the target condition, the foldable terminal to run a first application or stop running a second application in response to the first input.

According to the foldable terminal provided in this embodiment of the present disclosure, after the first input for the foldable terminal is received, when the folding angle meets the target condition, the foldable terminal is controlled to power on or power off. For example, when the first input is a deformation operation for the foldable terminal, in a case that a folding angle formed by the deformation operation meets the target condition, the foldable terminal is directly controlled to power on or power off, thereby effectively improving efficiency of the power-on or power-off operation.

When the first input is a tap operation for a specific key, power-on or power-off is quickly controlled based on the folding angle without touching and holding the specific key, thereby improving user experience.

In addition, according to the foldable terminal provided in this embodiment of the present disclosure, a specified application can be quickly run or stopped, thereby avoiding complex steps that the foldable terminal needs to switch to an interface of a specified application and then performs a complex stop operation on a corresponding operation interface to stop running the specified application, and finds an icon of a corresponding application and then receives a tap operation for the corresponding icon to run the specified application.

It should be understood that, in this embodiment of the present disclosure, the radio frequency unit 601 may be configured to receive and send information or a signal in a call process. Specifically, after receiving downlink data from a base station, the radio frequency unit 601 sends the downlink data to the processor 610 for processing. In addition, the radio frequency unit 601 sends uplink data to the base station. Usually, the radio frequency unit 601 includes but is not limited to an antenna, at least one amplifier, a transceiver, a coupler, a low noise amplifier, a duplexer, and the like. In addition, the radio frequency unit 601 may communicate with a network and another device through a wireless communication system.

The foldable terminal provides wireless broadband Internet access for the user by using the network module 602, for example, helping the user to send and receive an e-mail, browse a web page, and access streaming media.

The audio output unit 603 may convert audio data received by the radio frequency unit 601 or the network module 602 or stored in the memory 609 into an audio signal and output the audio signal as a sound. In addition, the audio output unit 603 may further provide an audio output (for example, a call signal received voice, or a message received voice) related to a specific function implemented by the foldable terminal 600. The audio output unit 603 includes a speaker, a buzzer, a telephone receiver, and the like.

The input unit 604 is configured to receive an audio signal or a video signal. The input unit 604 may include a Graphics Processing Unit (GPU) 6041 and a microphone 6042, and the graphics processing unit 6041 processes image data of a still picture or video obtained by an image capture apparatus (such as a camera) in a video capture mode or an image capture mode. A processed image frame may be displayed on the display unit 606. The image frame processed by the graphics processing unit 6041 may be stored in the memory 609 (or another storage medium) or sent by using the radio frequency unit 601 or the network module 602. The microphone 6042 may receive a sound and can process such sound into audio data. Processed audio data may be converted, in a call mode, into a format that can be sent to a mobile communication base station by using the radio frequency unit 601 for output.

The foldable terminal 600 further includes at least one type of sensor 605, such as a light sensor, a motion sensor, and another sensor. Specifically, the light sensor may include an ambient light sensor and a proximity sensor. The ambient light sensor may adjust luminance of the display panel 6061 based on brightness of ambient light. The proximity sensor may turn off the display panel 6061 and/or backlight when the foldable terminal 600 moves to an ear. As a type of the motion sensor, an accelerometer sensor may detect an acceleration value in each direction (generally, three axes), and detect a value and a direction of gravity when the accelerometer sensor is static, and may be used in an application for recognizing a foldable terminal posture (such as screen switching between landscape and portrait modes, a related game, or magnetometer posture calibration), a function related to vibration recognition (such as a pedometer or a knock), and the like. The sensor 605 may further include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information entered by a user or information provided for a user. The display unit 606 may include a display panel 6061. The display panel 6061 may be configured in a form of a Liquid Crystal Display (LCD), an Organic Light-Emitting Diode (OLED), or the like.

The input unit 607 may be configured to receive input numeral or character information, and generate key signal input related to user setting and functional control of the foldable terminal. Specifically, the user input unit 607 includes a touch panel 6071 and another input device 6072. The touch panel 6071 is also referred to as a touchscreen, and may collect a touch operation performed by a user on or near the touch panel 6071 (such as an operation performed by a user on the touch panel 6071 or near the touch panel 6071 by using any proper object or accessory, such as a finger or a stylus). The touch panel 6071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 610, and can receive and execute a command sent by the processor 610. In addition, the touch panel 6071 may be of a resistive type, a capacitive type, an infrared type, a surface acoustic wave type, or the like. The user input unit 607 may include another input device 6072 in addition to the touch panel 6071. Specifically, the another input device 6072 may include but is not limited to a physical keyboard, a functional key (such as a volume control button or a power on/off key), a trackball, a mouse, and a joystick. Details are not described herein.

Further, the touch panel 6071 may cover the display panel 6061. When detecting the touch operation on or near the touch panel 6071, the touch panel 6071 transmits the touch operation to the processor 610 to determine a type of a touch event, and then the processor 610 provides corresponding visual output on the display panel 6061 based on the type of the touch event. In FIG. 6, although the touch panel 6071 and the display panel 6061 are used as two independent parts to implement input and output functions of the foldable terminal, in some embodiments, the touch panel 6071 and the display panel 6061 may be integrated to implement the input and output functions of the foldable terminal. This is not specifically limited herein.

The interface unit 608 is an interface for connecting an external apparatus with the foldable terminal 600. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 608 may be configured to receive input (for example, data information and power) from an external apparatus and transmit the received input to one or more elements in the foldable terminal 600 or may be configured to transmit data between the foldable terminal 600 and an external apparatus.

The memory 609 may be configured to store a software program and various data. The memory 609 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 609 may include a high-speed random access memory or a nonvolatile memory, for example, at least one disk storage device, a flash memory, or another volatile solid-state storage device.

The processor 610 is a control center of the foldable terminal, and connects all parts of the entire foldable terminal by using various interfaces and lines. By running or executing a software program and/or a module stored in the memory 609 and invoking data stored in the memory 609, the processor 610 performs various functions of the foldable terminal and data processing, to perform overall monitoring on the foldable terminal. The processor 610 may include one or more processing units. Optionally, an application processor and a modem processor may be integrated into the processor 610. The application processor mainly processes an operating system, a user interface, an application, and the like. The modem processor mainly processes wireless communication. It can be understood that the foregoing modem processor may not be integrated into the processor 610.

The foldable terminal 600 may further include the power supply 611 (such as a battery) that supplies power to each component. Optionally, the power supply 611 may be logically connected to the processor 610 by using a power management system, so as to implement functions such as charging, discharging, and power consumption management by using the power management system.

In addition, the foldable terminal 600 includes some function modules not shown, and details are not described herein.

Optionally, an embodiment of the present disclosure further provides a foldable terminal, including a processor 610, a memory 609, and a computer program that is stored in the memory 609 and that can be run by the processor 610. When the computer program is executed by the processor 610, the foregoing processes of the embodiments of the method for controlling a foldable terminal are implemented and a same technical effect can be achieved. To avoid repetition, details are not described herein again.

Further, an embodiment of the present disclosure further provides a computer-readable storage medium. The computer-readable storage medium stores a computer program, and when the computer program is executed by a processor, the foregoing processes of the embodiments of the method for controlling a foldable terminal are implemented and a same technical effect can be achieved. To avoid repetition, details are not described herein again. The computer-readable storage medium includes a Read-only Memory (ROM), a Random Access Memory (RAM), a magnetic disk, or an optical disc.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is an exemplary implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

The invention claimed is:

1. A method for controlling a foldable terminal, comprising:
   receiving a first input for a foldable terminal, wherein the first input comprises deformation operation for the foldable terminal;
   obtaining a folding angle of the foldable terminal after receiving the first input; and
   controlling, when the folding angle meets a target condition, the foldable terminal to power on or power off in response to the first input, comprising:
      controlling, when the folding angle is greater than or equal to a first preset value, the foldable terminal to over on in response to the deformation operation performed on the foldable terminal; and
      controlling, when the folding angle is less than the first preset value, the foldable terminal to power off in response to the deformation operation performed on the foldable terminal.

2. The method according to claim 1, wherein the first input further comprises a press of a functional key of the foldable terminal and the receiving a first input for a foldable terminal comprises:
   receiving the press of the functional key of the foldable terminal, wherein the controlling, in a case that the folding angle meets a target condition, the foldable terminal to power on or power off in response to the first input comprises:

controlling, in a case that the folding angle is greater than or equal to a first preset value, the foldable terminal to power on in response to the press of the functional key; and controlling, in a case that the folding angle is less than or equal to the first preset value, the foldable terminal to power off in response to the press of the functional key.

3. The method according to claim 2, wherein the receiving the press of the functional key of the foldable terminal comprises:

receiving a press of a power key of the foldable terminal, wherein the controlling, in a case that the folding angle meets a target condition, the foldable terminal to power on or power off in response to the first input comprises:

controlling, in a case that the folding angle is greater than or equal to a second preset value, the foldable terminal to power on in response to the press of the power key; and controlling, in a case that the folding angle is less than or equal to the second preset value, the foldable terminal to power off in response to the press of the power key.

4. The method according to claim 1, further comprising:

controlling, in a case that the folding angle does not meet the target condition, the foldable terminal to run a first application or stop running a second application in response to the first input.

5. A foldable terminal, comprising a processor, a memory, and a computer program stored in the memory and executable on the processor, wherein when the computer program is executed by the processor, causes the processor to:

receive a first input for the foldable terminal, wherein the first input comprises a deformation operation for the foldable terminal;

obtain a folding angle of the foldable terminal after receiving the first input;

control, when the folding angle is greater than or equal to a first preset value, the foldable terminal to power on in response to the deformation operation performed on the foldable terminal; and control, when the folding, angle is less than the first preset value, the foldable terminal to power off in response to the deformation operation performed on the foldable terminal.

6. The foldable terminal according to claim 5, wherein the first input further comprises a press of a functional key of the foldable terminal and the processor is further configured to:

receive the press of the functional key of the foldable terminal;

control, in a case that the folding angle is greater than or equal to a first preset value, the foldable terminal to power on in response to the press of the functional key; and control, in a case that the folding angle is less than or equal to the first preset value, the foldable terminal to power off in response to the press of the functional key.

7. The foldable terminal according to claim 6, wherein the processor is further configured to:

receive a press of a power key of the foldable terminal;

control, in a case that the folding angle is greater than or equal to a second preset value, the foldable terminal to power on in response to the press of the power key; and control, in a case that the folding angle is less than or equal to the second preset value, the foldable terminal to power off in response to the press of the power key.

8. The foldable terminal according to claim 5, wherein the processor is further configured to:

control, in a case that the folding angle does not meet the target condition, the foldable terminal to run a first application or stop running a second application in response to the first input.

9. A non-transitory computer-readable storage medium, wherein the computer-readable storage medium stores a computer program, and when the computer program is executed by a processor, a method for controlling a foldable terminal is implemented, wherein the method for controlling Hall the foldable terminal comprises:

receiving a first input for the foldable terminal, wherein the first input comprises a deformation operation for the foldable terminal;

obtaining a folding angle of the foldable terminal after receiving the first input; and controlling, when the folding angle meets a target condition, the foldable terminal to power on or power off in response to the first input, comprising:

controlling, when the folding angle is greater than or equal to a first preset value, the foldable terminal to power on in response to the deformation operation performed on the foldable terminal; and controlling, when the folding angle is less than the first preset value, the foldable terminal to power off in response to the deformation operation performed on the foldable terminal.

10. The non-transitory computer-readable storage medium according to claim 9, wherein the first input further comprises a press of a functional key of the foldable terminal and the receiving a first input for a foldable terminal comprises:

receiving the press of the functional key of the foldable terminal, wherein the controlling, in a case that the folding angle meets a target condition, the foldable terminal to power on or power off in response to the first input comprises:

controlling, in a case that the folding angle is greater than or equal to a first preset value, the foldable terminal to power on in response to the press of the functional key; and controlling, in a case that the folding angle is less than or equal to the first preset value, the foldable terminal to power off in response to the press of the functional key.

11. The non-transitory computer-readable storage medium according to claim 10, wherein the receiving the press of the functional key of the foldable terminal comprises:

receiving a press of a power key of the foldable terminal, wherein controlling, in a case that the folding angle meets a target condition, the foldable terminal to power on or power off in response to the first input comprises:

controlling, in a case that the folding angle is greater than or equal to a second preset value, the foldable terminal to power on in response to the press of the power key; and controlling, in a case that the folding angle is less than or equal to the second preset value, the foldable terminal to power off in response to the press of the power key.

12. The non-transitory computer-readable storage medium according to claim 9, further comprising:

controlling, in a case that the folding angle does not meet the target condition, the foldable terminal to run a first application or stop running a second application in response to the first input.

* * * * *